(12) United States Patent
Inoue

(10) Patent No.: US 6,331,342 B1
(45) Date of Patent: *Dec. 18, 2001

(54) MAGNETIC RECORDING MEDIUM

(75) Inventor: Satoru Inoue, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,088

(22) Filed: Jul. 7, 1997

(30) Foreign Application Priority Data

Jul. 8, 1996 (JP) ...................................... 8-178135

(51) Int. Cl.$^7$ ...................................... G11B 5/738
(52) U.S. Cl. .......................... 428/141; 428/216; 428/323; 428/336; 428/694 BS; 428/694 SG; 428/900
(58) Field of Search ...................................... 428/323, 336, 428/694 BS, 694 SG, 900, 141, 216

(56) References Cited

U.S. PATENT DOCUMENTS

| | | | |
|---|---|---|---|
| 4,596,747 | * 6/1986 | Nishimatsu et al. | 428/694 |
| 4,664,965 | * 5/1987 | Okita et al. | 428/143 |
| 4,746,558 | * 5/1988 | Shimozawa et al. | 428/141 |
| 5,354,610 | * 10/1994 | Ozawa et al. | 428/323 |
| 5,510,140 | * 4/1996 | Kurose et al. | 427/131 |
| 5,698,286 | * 12/1997 | Ikarashi et al. | 428/65.3 |

* cited by examiner

Primary Examiner—Stevan A. Resan
(74) Attorney, Agent, or Firm—Bell, Boyd & Lloyd LLC

(57) ABSTRACT

A magnetic recording medium according to the present invention includes a nonmagnetic supporting base, a nonmagnetic layer coated on the nonmagnetic supporting base, and a magnetic layer coated on the nonmagnetic layer. A mean roughness from a center line as a surface roughness of the nonmagnetic supporting base ranges from 8.0 nm to 15 nm. A mean particle size of carbon black contained in the nonmagnetic layer is set to 300 nm or smaller. A thickness of the coated nonmagnetic layer obtained after it is dried is set smaller than 0.5 μm.

5 Claims, 2 Drawing Sheets

MAGNETIC RECORDING MEDIUM

BACKGROUND OF THE INVENTION

1. Field of the Invention

The present invention relates to a so-called coated-type magnetic recording medium in which a magnetic layer or the like is coated on a nonmagnetic base film.

2. Description of the Related Art

A so-called coated-type magnetic recording medium in which a magnetic layer or the like is coated on a nonmagnetic base film is generally formed by coating a magnetic coating formed of magnetic powders, a binding agent, an organic solvent and other additive on the nonmagnetic base film made of poly(ethylene terephthalate) or the like to dry it.

At this time, in order to especially secure an output of a video signal band and a C/N ratio thereof, a film thickness of the magnetic layer is controlled and a smooth base film having a center-line mean roughness Ra smaller than 8.0 nm is employed.

However, if a thickness of a coated film is reduced in order to reduce costs of a coating material and so on, then a ground of the base film influences a property of a surface of the magnetic recording medium, which lowers the output and the C/N ratio.

In order to solve this problem, it can be considered that a more smooth base film is used and more minute-particle magnetic powders are used. However, if the base film is made more smooth, then the manufacturing costs therefor are increased, which is a bar to reduce the costs of the materials and so on. If the more minute particle magnetic powders are used, it is difficult to disperse the particles in a solvent of the magnetic coating and there are then the problems that the coated magnetic powders are peeled off from the base film and that head clogging characteristics are lowered.

SUMMARY OF THE INVENTION

In view of such aspects, it is therefore an object of the present invention to provide a magnetic recording medium having satisfactory characteristics even if its magnetic layer is set thinner.

According to an aspect of the present invention, a magnetic recording medium includes a nonmagnetic supporting base, a nonmagnetic layer coated on the nonmagnetic supporting base, and a magnetic layer coated on the nonmagnetic layer. A mean roughness from a center line as a surface roughness of the nonmagnetic supporting base is set to 8.0 nm or larger and set to 15 nm or smaller. A mean particle size of carbon black contained in the nonmagnetic layer is set to 300 nm or smaller. A thickness of the coated nonmagnetic layer obtained after it is dried is set smaller than 0.5 $\mu$m.

DESCRIPTION OF THE PREFERRED EMBODIMENT

A magnetic recording medium according to an embodiment of the present invention will hereinafter be described with reference to the accompanying drawings.

Figure 1:
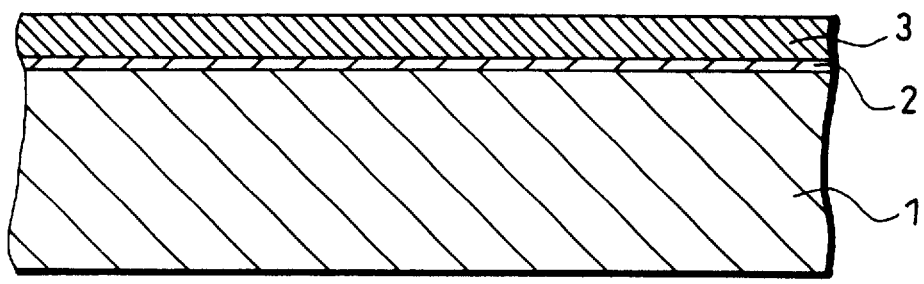
FIG. 1 is a cross-sectional view showing a cross section of the magnetic recording medium according to the present invention.

FIG. 1 is a cross-sectional view showing a cross section of the magnetic recording medium according to the embodiment of the present invention.

As shown in FIG. 1, a magnetic recording medium 10 has a nonmagnetic base film 1, a nonmagnetic layer 2 formed thereon and serving as an undercoat, and a magnetic layer 3 formed on the nonmagnetic layer 2.

The base film 1 is formed of a film made of poly(ethylene terephthalate) or the like and its center-line mean roughness Ra is set to 8.0 nm or larger. If a base film having a surface roughness smaller than 8.0 nm, i.e., having an excellent surface property, is used, then it becomes difficult to control a process of manufacturing the base film, which becomes a factor to increase the manufacturing costs of the magnetic recording medium. Therefore, the center-line mean roughness Ra is preferably set to 8.0 nm or larger. However, if the mean roughness Ra becomes too large, then the large mean roughness influences the magnetic layer 3, which deteriorates an electromagnetic conversion characteristic thereof. Therefore, an upper limit of the mean surface roughness Ra is set to 15 nm.

The nonmagnetic layer 2 is formed mainly of a carbon black and a binding agent and has a thickness smaller than 0.5 $\mu$m. Specifically, the nonmagnetic layer 2 serves to improve an adhesive strength against the base film 1. As the thickness of the coated nonmagnetic layer 2 becomes thick, the adhesive strength is lowered. The thickness of the nonmagnetic layer 2 is preferably set smaller than 0.5 $\mu$m (except 0).

A mean particle size of the carbon black is set to 300 nm or smaller, preferably to 50 nm or smaller and also set to 10 nm or larger, in order to obtain satisfactory flatness of the nonmagnetic layer 2. If the particle size becomes too small, the dispersion of the particles becomes unsatisfactory and the particles tends to be aggregated easily. Therefore, it is not preferable.

Carbon blacks of two kinds or larger having different particles sizes may be mixed.

The magnetic layer 3 is formed of a magnetic coating obtained by dispersing ferromagnetic powders in a binding agent. A thickness of the coated magnetic layer 3 is not limited, but in consideration of curl or the like, it is preferably set to 5 $\mu$m or smaller. Moreover, as understood from the embodiment described later on, in order to improve an effect of the nonmagnetic layer 2 remarkably, the thickness of the coated magnetic layer 3 is preferably set to 2 $\mu$m or smaller. However, since the electromagnetic conversion characteristic cannot be obtained if the thickness of the magnetic layer 3 is set too small, the thickness is set to 0.05 $\mu$m or larger.

The kind of the ferromagnetic powders used for the magnetic layer 3 is not limited particularly. Not only can ferromagnetic powders of $\gamma$-$Fe_2O_3$, $Fe_3O_4$ or intermediate oxide thereof having compositions represented by $FeO_x$ be used, but also a material obtained by adding Co to the above iron oxide and metal magnetic powders can be employed as the ferromagnetic powders used for the magnetic layer 3.

As the above metal magnetic powders, for example, Fe, Co, Ni, Fe—Ni alloy, Fe—Ni—Co alloy, Fe—Ni—P alloy, Fe—Ni—Zn alloy, Fe—Al—P alloy, Fe—Ni—Co—Zn alloy and so on can be employed.

The binding agent used in the same nomagnetic layer 2 and the magnetic layer 3 can include, for example, polyvinyl chloride resins, vinyl chloride-vinyl acetate copolymer, polyurethane resin, acrylic resin, isocyanate compound, phenol resin, epoxy resin and so on.

As the organic solvent, one of methyl ethyl ketone, cyclohexanone, tetyrahydrofuran, toluene, acetone, ethyl acetate, butyl acetate and so on is employed or two materials or larger thereof are mixed and used.

As the organic solvent, one of methyl ethyl ketone, cyclohexanone, tetrahydrofuran, toluene, acetone, ethyl acetate, butyl acetate and so on is employed or two materials or larger therof are mixed and used.

In this embodiment, at least one layer of the nonmagnetic layer 2 obtained by dispersing carbon black of more than one kind in the binding agent is coated on the nonmagnetic base film 1 made of poly(ethylene terephthalate) or the like, and the magnetic layer 3 obtained by dispersing the ferromagnetic powders in the binding agent is coated thereon. Thus, the magnetic recording medium 10 is manufactured, The nonmagnetic layer 2 and the magnetic layer 3 can be formed by a so-called wet-on-wet system in which a lower-layer coating liquid and an upper-layer coating liquid are coated overlappingly in their wet states.

When the lower-layer coating liquid and the upper-layer coating liquid are coated, the upper-layer coating may be coated after the lower-layer coating is coated, or both of the lower-layer coating liquid and the upper-layer coating liquid may be coated substantially simultaneously.

The base film made of poly(ethylene terephthalate) or the like usually has projections formed thereon. In general, as the base film has the larger center line mean roughness, the base film has the larger projections.

The carbon black and the binding agent forming the nonmagnetic layer 2 according to the present invention serve to cover a surface of the nonmagnetic base film 1 to thereby make the projections on the surface of the base film 1 apparently smaller. The magnetic layer 3 is coated on the nonmagnetic layer 2 set in its wet state, and hence, in this case, the nonmagnetic layer 2 serves as a supporting body.

Therefore, the coating used for the nonmagnetic layer 2 preferably has pigments with higher density and preferably has pigments of smaller particle sizes so as to make the flatness of the nonmagnetic layer 2. As a result, the carbon black used in the present invention preferably has the mean particle size of 300 nm or smaller and more preferably has the mean particle size of 50 nm or smaller. As described above, the carbon blacks having the particle sizes of two kinds or larger may be mixed.

The magnetic recording media 10 having the structure shown in FIG. 1 were manufactured to measure various characteristics thereof.

INVENTIVE EXAMPLE 1

A poly(ethylene terephthalate) film having a thickness of 13 μm and a center-line mean roughness Ra of 11 nm was prepared as the base film 1.

A nonmagnetic-layer coating liquid having the following mixing ratio shown in Table 1 was prepared.

TABLE 1

| | |
|---|---|
| carbon block (manufacture by CABOT Co. under the trade name of BP-L and having mean particle size of 24 nm) | 100 parts by weight |
| polyester polyurethane | 30 parts by weight |
| methyl ethyl ketone | 70 parts by weight |
| toluene | 70 parts by weight |
| cyclohexanone | 70 parts by weight |

This nonmagnetic layer coating liquid was coated on the base film to form the nonmagnetic layer 2. A thickness of the nonmagnetic layer 2 measured after the coated nonmagnetic layer was dried was set to 0.3 μm.

A magnetic layer coating liquid having the following mixing ratio shown in Table 2 was prepared.

TABLE 2

| | |
|---|---|
| Fe—Al alloy magnetic powder (having a coercive force of 160 kA/m, a saturation magnetization amount of 145 Am$^2$/kg, a specific surface area of 51 m$^2$/g, a long-axis length of 0.08 μm, and a needle ratio of 3 and having Al attached to its surface for preventing sintering) | 100 parts by weight |
| vinyl chloride system copolymer resin | 15 parts by weight |
| nitrocellulose | 5 parts by weight |
| polyester urethane | 5 parts by weight |
| alumina | 4 parts by weight |
| fatty acid (stearic acid) | 1 part by weight |
| methyl ethyl ketone | 100 parts by weight |
| toluene | 100 parts by weight |
| cyclohexanone | 100 parts by weight |

Total parts by weight of methyl ethyl ketone, toluene and cyclohexanone in the solvent were set to 300 parts by weight.

Polyisocyanate (manufactured by Nihon Polyurethane Co. under the trade name of colonate L) of 3 parts by weight as a curing agent was added to each of the magnetic layer coating liquid and the nonmagnetic layer coating liquid respectively having the above compositions. The magnetic layer coating and the nonmagnetic layer coating were simultaneously and overlappingly coated on the nonmagnetic base film 1 made of poly(ethylene terephthalate) (PET) (i.e., coated by a so-called wet-on-wet system) by using a 4-lip die coater shown in FIG. 2 so as to form films. Then, the coated magnetic-layer coating liquid and the coated nonmagnetic-layer coating liquid were subjected to an orientation processing by using a solenoid coil or the like and then dried, calendared and cured. A thickness of the magnetic layer 3 was got to 1.0 μm, and a thickness of the nonmagnetic layer 3 was set to 0.3 μm.

Figure 2:
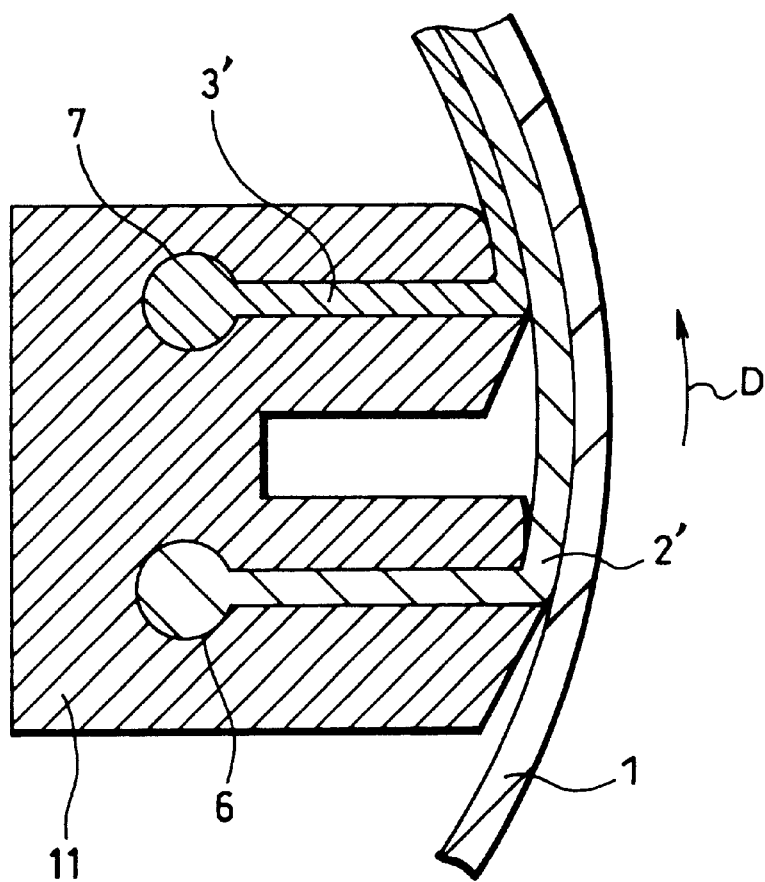
FIG. 2 is a diagram used to explain a coating method of wet-on-wet system.

As shown in FIG. 2, while the supplied nonmagnetic base film 1 made of poly(ethylene terephthalate) was being conveyed in the direction shown by an arrow D, two layers of the nonmagnetic layer 2 and the magnetic layer 3 were formed by the die coater 11 employing the wet-on-wet method by extruding by ejecting a nonmagnetic-layer coating liquid 2' and a magnetic-layer coating liquid 3' from their coating liquid storage portions 6, 7.

As described above, the magnetic recording medium 10 having the structure shown in FIG. 1 was formed.

INVENTIVE EXAMPLE 2

A magnetic recording medium 10 according to an inventive example 2 was formed similarly to that of the inventive example 1 except that a thickness of the magnetic layer 3 was set to 2.0 μm.

INVENTIVE EXAMPLE 3

A magnetic recording medium 10 according to an inventive example 3 was formed similarly to that of the inventive example 1 except that a thickness of the magnetic layer 3 was set to 3.0 μm.

INVENTIVE EXAMPLE 4

A magnetic recording medium 10 according to an inventive example 4 was formed similarly to that of the inventive example 1 except that a thickness of the nonmagnetic layer 2 was set to 0.1 μm.

INVENTIVE EXAMPLE 5

A magnetic recording medium 10 according to an inventive example 5 was formed similarly to that of the inventive example 1 except that a carbon black having a mean particle size of 270 nm was used to prepare the nonmagnetic-layer coating liquid.

Comparative Example 1

A magnetic recording medium according to an comparative example 1 was formed similarly to that of the inventive example 1 except that the nonmagnetic layer 2 was not formed and the magnetic layer 3 was formed on the base film 1.

Comparative Example 2

A magnetic recording medium 10 according to an comparative example 2 was formed similarly to that of the comparative example 1 except that a thickness of the magnetic layer 3 was set to 2.0 μm.

Comparative Example 3

A magnetic recording medium according to an comparative example 3 was formed similarly to that of the comparative example 1 except that a thickness of the magnetic layer 3 was set to 3.0 μm.

Comparative Example 4

A magnetic recording medium according to an comparative example 4 was formed similarly to that of the inventive example 3 except that a thickness of the nonmagnetic layer 2 was set to 0.7 μm.

Comparative Example 5

A magnetic recording medium according to an comparative example 5 was formed similarly to that of the comparative example 1 except that a base film having a surface roughness with a mean roughness from a center line of 6.5 nm was employed as the nonmagnetic base film 1.

Various characteristics of the magnetic recording media according to inventive examples 1 to 5 and comparative examples 1 to 5 were measured as follows.

1) Center-line Mean Roughness of a Magnetic Layer

A center-line mean roughness of the magnetic layer 3 of each of the magnetic recording media according to inventive examples 1 to 5 and comparative examples 1 to 5 was measured by using a non-contact type surface roughness meter (manufactured by Kosaka Laboratory Co. under the trade name of ET-30HK) under the condition that a magnifying power was one hundred thousand and under a cutoff condition of 0.08 mm.

2) RF Output and C/N Ratio

Each of the magnetic recording media was loaded onto a digital video cassette recorder (VCR) manufactured by Sony Co. to measure its RF output and C/N ratio.

Measured results are shown on Table 3.

In Table 3, values of the RF output and the C/N ratio were respectively estimated by employing values thereof obtained from the magnetic recording medium according to the comparative example 3 as reference values (=0).

TABLE 3

| | thickness of nonmagnetic layer μm | thickness of magnetic layer μm | mean roughness from center line of magnetic layer μm | RF output dB | C/N dB | adhesion intensity mN |
|---|---|---|---|---|---|---|
| inventive example 1 | 0.3 | 1.0 | 0.0071 | −1.2 | −1.2 | 508 |
| inventive example 2 | 0.3 | 2.0 | 0.0060 | −0.3 | −0.1 | 422 |
| inventive example 3 | 0.3 | 3.0 | 0.0049 | 0.6 | 1.0 | 373 |
| inventive example 4 | 0.1 | 1.0 | 0.0079 | −1.5 | −1.6 | 589 |
| inventive example 5 | 0.3 | 1.0 | 0.0124 | −1.8 | −2.1 | 495 |
| comparative example 1 | none | 1.0 | 0.0084 | −3.7 | −3.4 | 520 |
| comparative example 2 | none | 2.0 | 0.0060 | −0.9 | −0.6 | 441 |
| comparative example 3 | none | 3.0 | 0.0056 | 0.0 | 0.0 | 412 |
| comparative example 4 | 0.7 | 3.0 | 0.0043 | 0.6 | 1.3 | 245 |
| comparative example 5 | none | 1.0 | 0.0070 | −1.4 | −1.3 | 524 |

Study of Table 3 reveals that when a magnetic recording medium, e.g., each of those according to the comparative examples 1 to 3, has the mean roughness from a center line of 11 nm and no nonmagnetic layer and, if the magnetic recording medium has a magnetic layer with its thickness of 2 μm or smaller, then its RF output and C/N ratio are deteriorated. Particularly that if the magnetic recording medium, e.g., that according to the comparative example 1 has a magnetic layer with its thickness of 1.0 μm, then the RF output and C/N ratio are considerably deteriorated.

Contrary, study of Table 3 reveals that each of the magnetic recording media 10 according to the inventive examples 1 to 4 having the nonmagnetic layers 2, the magnetic recording medium 10 according to the inventive example 2 having the magnetic layer with its thickness of 2 μm has characteristics approximate to those of the magnetic recording medium according to the comparative example 3 having the magnetic layer with its thickness of 3 μm, i.e., that when a magnetic recording medium has a nonmagnetic layer even if it has a thin magnetic layer, it can achieve the characteristics similar to those of a magnetic recording medium having a thick magnetic layer.

Comparison of the magnetic recording media 10 according to the inventive example 1 and the comparative example 1 both having the magnetic layers with their thicknesses of 1 μm reveals that provision of the nonmagnetic layer 2 improves a surface property of the magnetic recording medium and hence its electromagnetic conversion characteristic is improved by 2 dB or greater. When the present invention is applied to a magnetic recording medium having a nonmagnetic recording medium with its mean roughness from a center line of 8.0 nm or larger, the magnetic recording medium can achieve an effect equal to that of the magnetic recording medium according to the comparative example 5 having the nonmagnetic recording medium with a satisfactory surface property.

However, as shown in Table 3, as shown in the comparative example 4, as the thickness of the nonmagnetic layer is larger, the adhesion strength becomes lower. Therefore, the thickness of the nonmagnetic layer is preferably set smaller than 0.5 μm.

Study of the measured results shown in Table 3 of the magnetic recording media 10 according to the inventive examples 1 to 5 reveals that formation of the nonmagnetic layer 2 provides a satisfactory electromagnetic conversion characteristic even if the magnetic layer is made thinner.

The present invention can similarly be applied to a magnetic recording medium having a back coating layer formed of carbon or the like on a rear surface of the base film 1 as well as the same structure of the magnetic recording medium 10 according to this embodiment, and a magnetic recording medium having the same structure of the magnetic recording medium 10 according to this embodiment and further other layers.

According to the magnetic recording medium of the present invention, it is possible to improve the surface property and the electromagnetic conversion characteristic without any special processing being effected on the base film or the magnetic layer.

Since the surface property and the electromagnetic conversion characteristic can be maintained even if the magnetic layer is made thinner, it is possible to form the magnetic recording medium with lower costs by making the magnetic layer thinner.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A magnetic recording medium comprising:

a nonmagnetic supporting base having a surface roughness ranging from 8.0 nm to 15 nm;

a nonmagnetic layer coated on said nonmagnetic supporting base, the nonmagnetic layer including at least two kinds of carbon black as the only nonmagnetic particles in said nonmagnetic layer, the carbon black having a mean particle size of less than 50 nm and having a thickness, obtained after the nonmagnetic layer is dried, ranging from greater than 0 $\mu$m to 0.5 $\mu$m but thicker than the mean particle size of the carbon black; and a magnetic layer coated on said nonmagnetic layer, the magnetic layer having a thickness, after the magnetic layer is dried, ranging from 0.5 $\mu$m to 2.0 $\mu$m.

2. A magnetic recording medium according to claim 1, wherein the mean particle size of said carbon black ranges from 10 nm to 50 nm.

3. A magnetic recording medium according to claim 1, wherein said nonmagnetic layer and said magnetic layer are formed by wet-on-wet system.

4. A magnetic recording medium according to claim 1 wherein the nonmagnetic supporting base is made of poly (ethylene terephthalate).

5. A magnetic recording medium according to claim 1, wherein the carbon black mean particle size ranges from 10 nm to less than 30 nm.

* * * * *